United States Patent [19]

Aparo

[11] Patent Number: 5,214,580
[45] Date of Patent: May 25, 1993

[54] PROCESS FOR IDENTIFYING DISCRETE DATA REPRESENTATIVE OF AN INPUT SAMPLE STREAM

[75] Inventor: Richard Aparo, Newton, Mass.

[73] Assignee: Hewlett-Packard Company, Palo Alto, Calif.

[21] Appl. No.: 544,715

[22] Filed: Jun. 27, 1990

[51] Int. Cl.$^5$ ............................................. G06F 15/00
[52] U.S. Cl. ........................... 364/413.01; 364/413.03; 364/413.05
[58] Field of Search .............. 364/413.05, 575, 413.01, 364/413.03

[56] References Cited

U.S. PATENT DOCUMENTS

| | | | |
|---|---|---|---|
| 4,194,183 | 3/1980 | Neuner et al. | 364/575 |
| 4,308,098 | 12/1991 | Neuner et al. | 364/575 |
| 4,499,548 | 3/1985 | Beebe | 364/575 |
| 4,503,510 | 3/1985 | Weaver | 364/715 |

Primary Examiner—Roy N. Envall, Jr.
Assistant Examiner—Ari M. Bai
Attorney, Agent, or Firm—Richard F. Schuette

[57] ABSTRACT

Processing waveform data for compressed display. A parameter to be displayed is measured, digitized, and displayed on a device that does not permit display of all of the data samples; thus, the digitized data is converted to a compressed form. For a compression factor of N input samples for each displayed sample, a displayed sample is taken from each successive group of N input samples. The choice of input sample is as follows: the sample having the maximum value of the group is chosen if all of the samples of the group are greater than or equal to the previous displayed sample; if all of the samples of the group are less than or equal to the previous displayed sample, then the sample having the minimum value is chosen; if the maximum and minimum values of a group straddle the value of the previous displayed sample, then a maximum sample and a minimum sample are chosen from the combination of that group and the next group. The technique can be applied in situations where N is not an integer. In such situations, the technique includes the calculation of an additional "pivot sample" for at least some of the groups.

15 Claims, 4 Drawing Sheets

PROCESS FOR IDENTIFYING DISCRETE DATA REPRESENTATIVE OF AN INPUT SAMPLE STREAM

FIELD OF THE INVENTION

This invention relates to the processing of signals and more particularly to the generation of output signals representative of a stream of input-samples.

BACKGROUND OF THE INVENTION

Physiological functions, such as the electrical activity of the heart or instantaneous blood pressure measurements, are generally expressed as analog waveforms signals on strip chart recorders and CRT displays. For signal processing reasons, these signals are generally digitized prior to display. Unfortunately, digitization usually occurs at a rate which is greater than the display apparatus can accommodate such that the sample-rate of the wave-data must be adjusted to facilitate displaying the waveform on a discrete imaging medium, such as a bit-mapped CRT or LCD screen, or on a dot-matrix printer.

A typical an analog-to-digital converter may output digital data samples corresponding to some type of electrical activity at the rate of 3000 samples per second. If the display device can only drive 100 pixels (samples) per second, a thirty-to-one digitized data sample to representative display sample compression ratio is required. One way of providing the required compression of the data in this situation would be to average each successive group of thirty data samples. Unfortunately, this reduces the amplitude of narrow pulses to the point where they may become indistinguishable from noise and results in the loss of signal features.

U.S. Pat. No. 4,499,548 discloses a "peak-picking" technique for compressing data in which the absolute difference between the value of each digitized data ample in a group of data samples and the average value of the previous group of digitized data samples is determined. The data sample which has the largest absolute difference is selected as the representative display sample. In another embodiment, the data sample which differs the most from the data sample that was selected as the display sample in the previous group is selected as the representative display sample. The principle limitation of this technique is the loss of feature-amplitude-fidelity at high compression-factors. With high compression-factors, peak-picking attenuates or even obliterates parts of poly-phasic features of waveforms. For example, a bi-phasic pace-pulse may be represented as a mono-phasic pulse in a peak-picked waveform.

Cascading is a compression technique in which a data stream is compressed and the resulting data is compressed again. Peak-picking is unsuitable for cascading as severe distortion may arise upon averaging a number of consecutive samples. After the first application of the method, the sample-stream contains only peaks, and averaging them no longer provides a valid criterion for sample selection.

"Pair-picking" is a known technique which maintains this feature-amplitude-fidelity for most compression-factors by plotting a vertical line segment between the maximum and minimum data sample in each group of data samples. The ordered-sample-pair output format employed by this technique is convenient for drawing waveforms, but inconvenient for other applications of the data. Integer compression factors can be applied to generate one sample-pair to be mapped directly onto each column of pixels in a bitmap or to define the limits of each scan of a digital-recorder print-head to produce a waveform image.

SUMMARY OF THE INVENTION

Pair/peak-picking is a new method for adjusting the sample-rate of wave-data to facilitate displaying a waveform on a discrete imaging medium. This technique provides for both compression and interpolation of wave-data for both integer as well as rational compression factors.

In the integer compression mode, a sample-stream is compressed by selecting one output-sample for every N input-samples, where N is an integer greater than one. Poly-phasic features of waveforms may be displayed by collapsing individual features into "envelope" features as the compression-ratio is increased. This approximates the behavior of analog media such as oscilloscopes and stripchart recorders. As the timebase is compressed, adjacent features first fuse, then larger features eclipse smaller ones to create envelope features.

Integer compression can be used when the display rate divides evenly into the sampling rate. A representative sample is taken from each group of N consecutive samples. The sample having the maximum value is chosen as the representative sample if all the samples of the group of N samples are greater than or equal to the previous representative output samples. The sample having the minimum value is chosen if all the samples in the group of N samples have an amplitude which is less than or equal to the previous representative output sample. If the maximum and minimum samples of the group straddle the previous output sample, then the size of the group is expanded by including the next group of N samples. The maximum and minimum samples in this expanded group are then chosen as the representative output samples. The relative time-order of these two samples in the output sample-stream must be maintained. When there are multiple equal maximum samples, the resolution of "ties" is arbitrary.

The rational-factor mode provides for sampling rate/display rate compression ratios which can be expressed as the ratio of two non-negative integers. This technique produces one output-sample for every group of N input-samples, where N is a rational number represented exactly by the reduced-fraction $N_N/N_D$ ($N_N$=numerator and $N_D$=denominator) and approximately by $N_I$=integer-part and $N_F$=fraction-part). For values of N greater than one, the algorithm compresses the input sample-stream. For values of N less than one, the technique expands the input sample-stream. The underlying technique for picking a representative sample employed with integer compression is also utilized with rational compression. In the rational-factor mode, an additional term, defined as the "pivot sample" is added to the group of N input samples. The pivot sample corresponds to an estimate of the value of the input signal if it were sampled at the fractional-part after the last input sample. (A pivot-sample may also be used in the integer-factor mode where it is defined as the last sample in the previous group of input samples.)

FIG. 1 illustrates an analog input signal in which the effects of digital sampling are denoted by a series of N vertical lines. A digital output stream may be defined as the digitized series of N samples, the magnitudes of which correspond to the intersection of the vertical lines and the analog input signal. As previously set forth, it is often necessary to compress the results of such digital sampling to correspond to the number of pixels etc. of displayable data. A typical compression-factor can be expressed as the ratio of two non-negative integers $N_N/N_D$ where $N_N$ is typically the digitizer sampling rate (samples per second) and $N_D$ is the rate of waveform plotting (pixel-columns per second).

A displayable pixel (column) represents a sample interval of N samples. The end of each sample interval or pixel length is demarcated by an index variable "J" (a pointer) that regulates the flow of input-samples to be compressed. The index variable has separable integer and fractional parts $(J_I+J_F)$ corresponding to $N_I$ and $N_F$. The integer portion $J_I$ is reset to zero after each calculation, where as, the fractional parts $J_F$ are continually combined and when this sum exceeds a whole number, $J_I$ is updated. The invention provides for a processing loop in which the index variables are employed for calculating the magnitude of an intermediate sample. At most, one such sample must be calculated for each interval, minimizing any required computation. Where $J_F$ is zero, the intermediate sample becomes the pivot-sample. Otherwise, the last input-sample becomes the pivot-sample.

The number of input-samples which are included in the group from which a single output-sample is selected is dependent upon the current value of $J_I$, instead of a fixed integer value. The current value of $J_F$ (if non-zero) is used to calculate, through linear interpolation, the intermediate sample between the last of the $J_I$ input-samples and the following input-sample (new-sample). The pivot sample (or last sample in each group) is included as the first sample in the subsequent group. This pivot sample does not count as one of the $J_I$ input-samples.

The last input-sample of each group is defined as the "saved-sample" and is used in the calculation of multiple intermediate-samples between two successive input-samples. This happens when the value of N is less than one, such that $J_I$ can be zero for some groups. When the value of $J_I$ is zero, the saved-sample is used to calculate the next intermediate-sample and is not included in any group other than the one from which it originates. The saved-sample is not updated until a group with a non-zero value of $J_I$ is encountered, thus, multiple successive groups may use the same saved-sample.

If a straddle condition occurs, the interval delimited by J is expanded to define a larger group from which two output-samples are selected. The new value of $J_I$ determines the number of new input-samples to be added to this larger group. The new value of $J_F$ is used to generate a final intermediate-sample (pivot-sample) included in the expanded group.

Exact synchronization of two or more parallel waveforms can be achieved by applying time-offsets to the input sample-stream in the initialization stage. Essentially, one waveform is advanced in time with respect to another by discarding a number of samples. Fractional sample-period adjustments can be applied by initializing $J_F$ to a non-zero value.

DETAILED DESCRIPTION OF THE INVENTION

Figure 1:
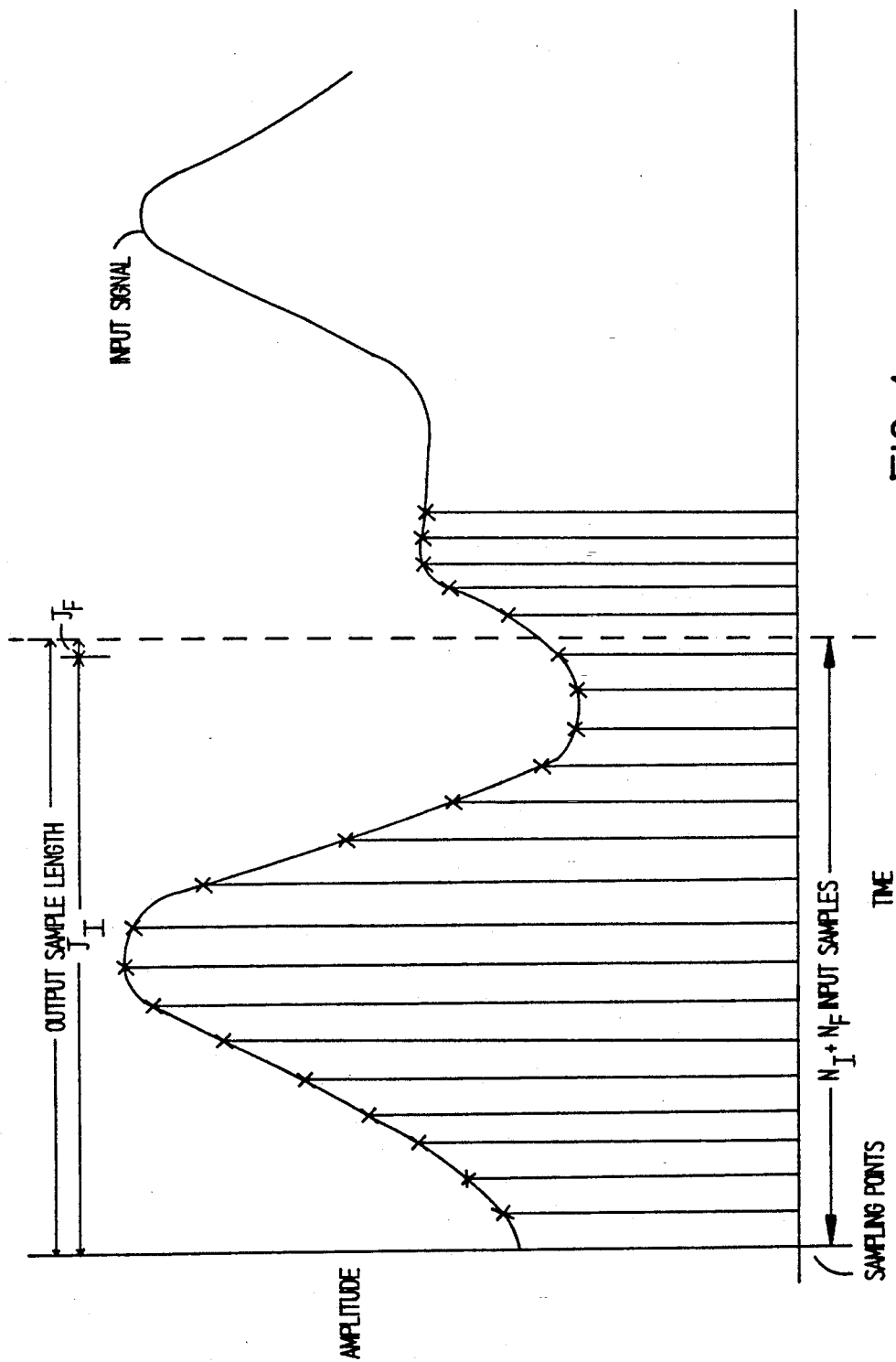
FIG. 1 illustrates an analog input signal which is sampled at discrete intervals.

The input-signal of FIG. 1 is sampled at a sampling rate corresponding to the characteristics of the analog-to-digital converter employed. Each sample represents a discrete value which can be plotted on some form of display or recorder. The number of samples per second which can be plotted is typically limited by the type of display and generally requires that the input-sample-stream be compressed.

Figure 2:
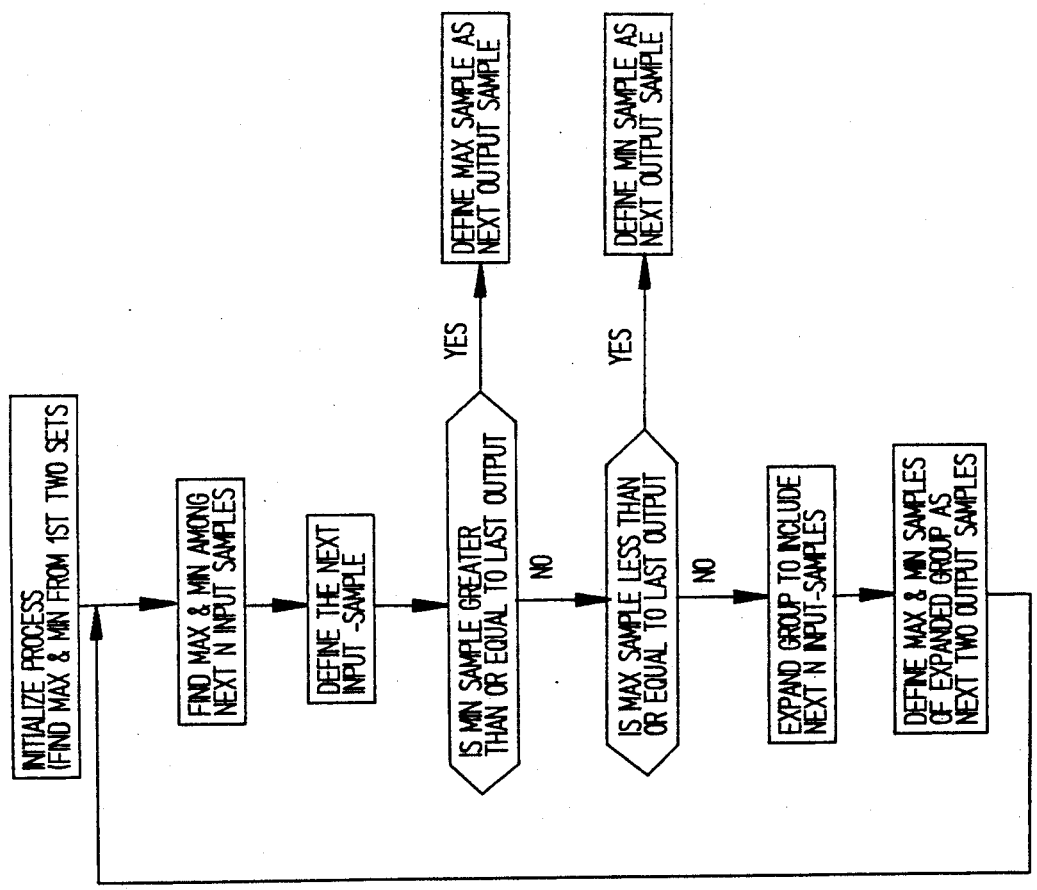
FIG. 2 is a flow chart setting forth the integer compression mode for processing an input-sample stream in which the display rate divides evenly into the sampling rate.

The flow diagram of FIG. 2 illustrates the operation of this process for integer compression factors. The process may be initialized by finding the maximum and the minimum sample from among the first two sets of N input-samples. The order in which these samples occurs must be maintained (alternatively, the first input-sample can be selected as the first output sample to achieve initialization). After the process has been initialized, a "continuous-processing loop" can be maintained for compressing the rest of the input sample stream.

The following four steps are employed:

1) Find the maximum and minimum samples among the next N input-samples, maintaining the order in which they occur. The first input-sample after this group of N samples is defined as the "next input-sample"

2) If the minimum sample from step 1 is greater than or equal to the last output-sample, the maximum sample becomes the next output sample.

3) If the maximum sample from step 1 is less than or equal to the last output-sample, the minimum sample becomes the next output sample.

4) If neither step 2 or step 3 apply, then the maximum and minimum samples from step 1 must straddle the last output-sample. The sample group is then expanded to include the next N input-samples in addition to the maximum and minimum samples from step one. The maximum and minimum samples from this expanded group are selected as the representative output samples preserving order of occurrence. Step 1 is then repeated with the input-sample that follows the N input-samples in this step as the next sample.

The integer compression technique requires that the sampling rate can be divided evenly into the display rate such that there are an integer number of samples corresponding to each output sample to be displayed. When this is not the case, the rational compression mode is required to accomplish the desired compression. The rational-mode provides for calculation of intermediate-samples falling between successive input-samples, where necessary. Intermediate samples need to be calculated only at the boundaries of "groups" of input-samples. An intermediate-sample corresponds to an estimate of the value of the input signal if it were sampled at the fractional-interval following the last input-sample of the group. An interpolation formula for calculating the value of the pivot-sample may be defined as follows:

saved-sample + ($J_F$ X (new-sample − saved-sample))

where the saved-sample is the last input-sample, $J_F$ is the fractional part of the interval index and the new-sample is the value of first sample in the next group of N input-samples.

Figure 3:
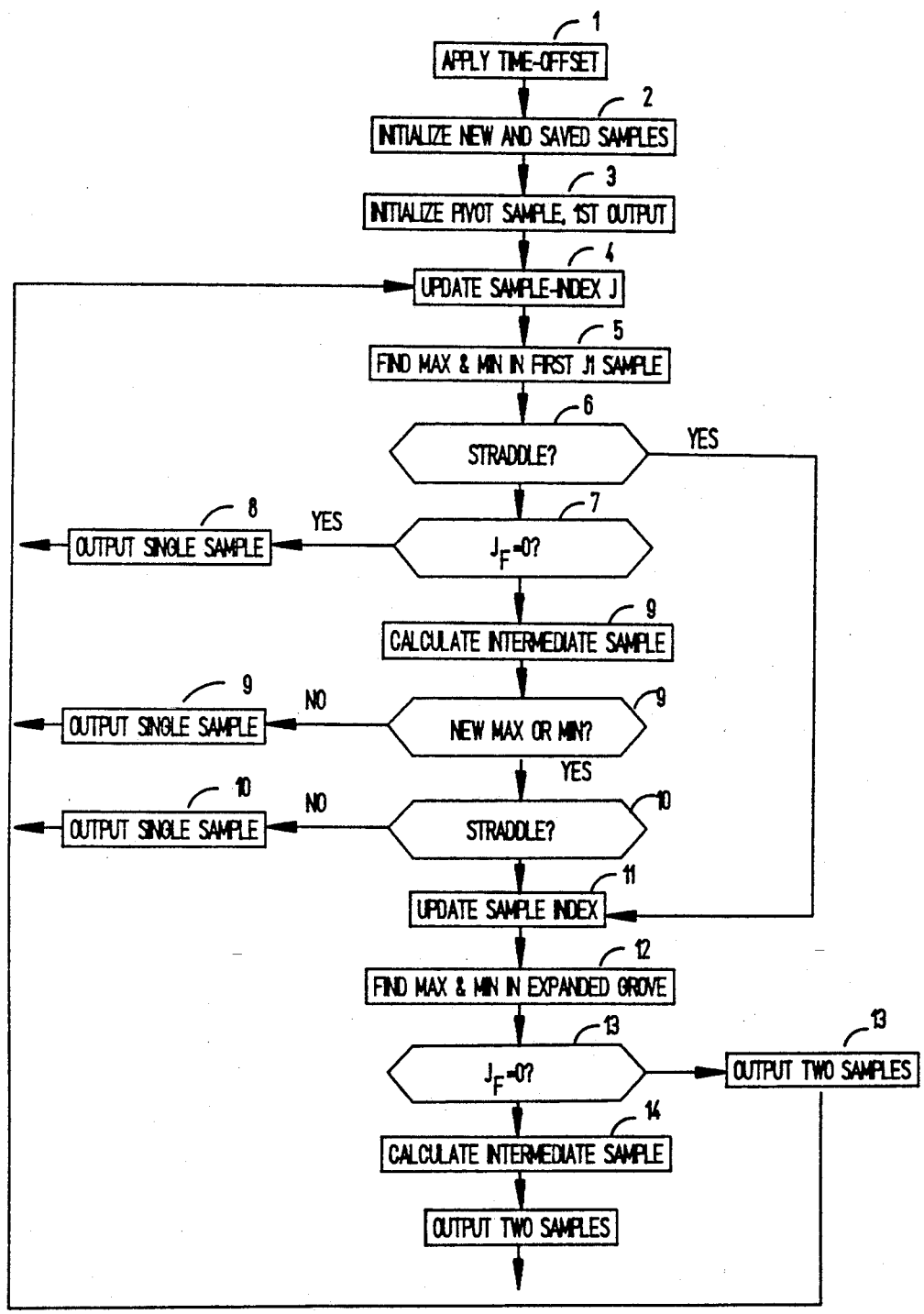
FIG. 3 is a flow chart setting forth the rational compression mode for processing an input-sample stream in which the display rate does not divide evenly into the sampling rate.

The flowchart of FIG. 3 sets forth the operation of the rational compression mode. The first three steps are required for initialization of the process such that the signal can be synchronized with other input signals being displayed at the same time as well as assigning initial value to $J_F$ and $J_I$. Steps four through fourteen comprise the continuous-processing loop in which $J_I$ input-samples are read from the input-stream and, like in the integer compression mode, the maximum and minimum samples are located and a determination is made as to whether a straddle condition exists. If a straddle condition exists, then the size of the sample group is extended. If no straddle condition exists, then the intermediate-sample is calculated and added to the group of input-samples. If the intermediate-sample is not a new maximum or minimum, then a single sample is outputted. If a straddle condition exists, then the size of the sample group is extended and the maximum and minimum samples are outputted in order as the samples representing those two groups.

Initialization of the Process

Step 1. When more than one signal is being analyzed at one time, it is helpful to synchronize the multiple signals. Synchronization can be achieved by reading and discarding the first integer input samples ($T_I$) and assigning the fractional length $T_F$ to $J_F$, 0 to $J_I$, and $N_D$ to the correction-counter (When the $N_I + N_F$ representation of N is not exact, the approximation-error will accumulate in the representation of J. The error in J can be corrected by rounding J to the nearest integer after each $N_D$ times it is updated. If a time-offset was applied, J is corrected by rounding to the nearest value with $J_F = T_F$. The correction-counter keeps track of the number of times J is updated to determine when the correction is to be applied).

Step 2. The new and saved samples are then initialized by reading in the first two samples and defining the first one as the saved-sample and the second one as the new-sample.

Step 3. The pivot-sample is initialized according to the value of $J_F$. If $J_F$ is equal to 0, then the saved-sample is also the first output sample and the first pivot-sample. If $J_F$ is not equal to 0, then the first pivot-sample and first output-sample, is the calculated intermediate-sample between the saved-sample and the new-sample having an offset $J_F$.

Continuous-processing Loop

Step 4. To update the next sample index J, N is added to it and the correction-counter is decremented (adding the fractional parts of J and N may generate an integer carry). If the correction-counter goes to zero, then J is adjusted to cancel the accumulating error and $N_D$ is assigned to the correction-counter. (Typically, N and J are each implemented as a binary word which is divided in half to create the integer-part in the upper-half and the fractional-part in the lower half). The binary integer in the lower half of the word constitutes the numerator of $J_F$.

Step 5. Identify the maximum and the minimum samples among the first $J_I$ input-samples and the pivot-sample. If $J_I$ is zero, the pivot-sample is defined as both the maximum and minimum sample. If not, then the current new-sample is defined as the first of the $J_I$ input-samples, and the rest are read one-at-a-time from the input stream. An extra sample is then read to re-initialize the new-sample.

Step 6. Prior to doing the calculation for the pivot-sample, a determination is made as to whether a straddle condition exists. If this condition is identified (where the maximum and minimum from step 5 are respectively greater than and less than the last output-sample) then the selection of a pair of output samples can be made (go to step 11) and intermediate-sample calculation is skipped.

Step 7. If $J_F$ is something other than zero, a pivot-sample must be calculated (go to step 9).

Step 8. Assuming $J_F$ is equal to zero, there is no intermediate-sample and a single sample can be outputted and the loop can be restarted (go to step 4). The maximum sample from step 5 is identified as the single sample if it is greater than or equal to the last output-sample. If the minimum sample from step 5 is less than the last output-sample, then the minimum sample is identified as the next output-sample. The saved-sample then becomes the next pivot sample and the process continues with step 4.

Step 9. The intermediate-sample is between the saved-sample and the new-sample and is calculated by interpolation using the formula:

Int.-sample = saved-sample + ($J_F$ X (new-sample − saved-sample))

If the intermediate-sample is greater than the maximum from step 5, the this intermediate-sample becomes the new maximum and the process continues with step 10. If the pivot-sample is less than the minimum from step 5, the intermediate-sample becomes the new minimum and continue with step 10. If the pivot-sample is neither greater than the maximum nor less than the minimum, then select the next output-sample from the maximum or minimum from step 5 as follows: if the maximum is greater than or equal to the last output-sample, assign it as the next output-sample. If the minimum is less than the last output-sample, assign the minimum sample as the next output-sample. The intermediate sample is then identified as the next pivot-sample and the process continue at step 4.

Step 10. If the minimum from step 9 is greater than or equal to the last output-sample, then the maximum is assigned as the next output-sample, the intermediate-sample is copied to the pivot-sample, and the process continues at step 4. If the maximum from step 9 is less than or equal to the last output-sample, then the minimum is assigned as the next output-sample, the intermediate-sample is copied as the pivot-sample and the process continues at step 4. If neither of the above, then continue on with Step 11.

Step 11. J is updated to identify the next input-samples to be included in a pair-pick. $J_I$ is assigned to 0, N is added to J and the correction-counter is decremented. If the correction-counter goes to zero, J is adjusted to cancel accumulating error and $N_D$ is assigned to the correction counter.

Step 12. Pair-Picking with just the input-samples first is accomplished by finding the maximum and the minimum among the current maximum and minimum (from step 5 or step 9) and the next $J_I$ input samples. If $J_I$ is equal to zero (no input samples), do not change anything, otherwise, use the current new-sample as the first of the $J_I$ input-samples, the input stream is then read and the last input-sample to be read is defined as the saved-sample. The new-sample is reinitialized by reading in an extra input-sample to make the total number of samples read in this step equal to $J_I$.

Step 13. If $J_F$ is zero, assign the maximum an the minimum from step 12 as the next two output-samples in the same order in which they occurred in the input-stream. The saved-sample then becomes the pivot-sample and the process continues with step 4.

Step 14. If $J_F$ is not zero, calculate an intermediate-sample between the saved-sample and the new sample through interpolation with $J_F$. If the intermediate-sample is greater than the current maximum, make the intermediate-sample the new maximum. If the intermediate-sample is less than the current minimum, make the intermediate-sample the new minimum. Assign the maximum and the minimum as the next two output-samples in the same order in which they occurred in the input-stream. The pivot-sample then takes on the value of the intermediate-sample and the process continues with step 4.

Figure 4:
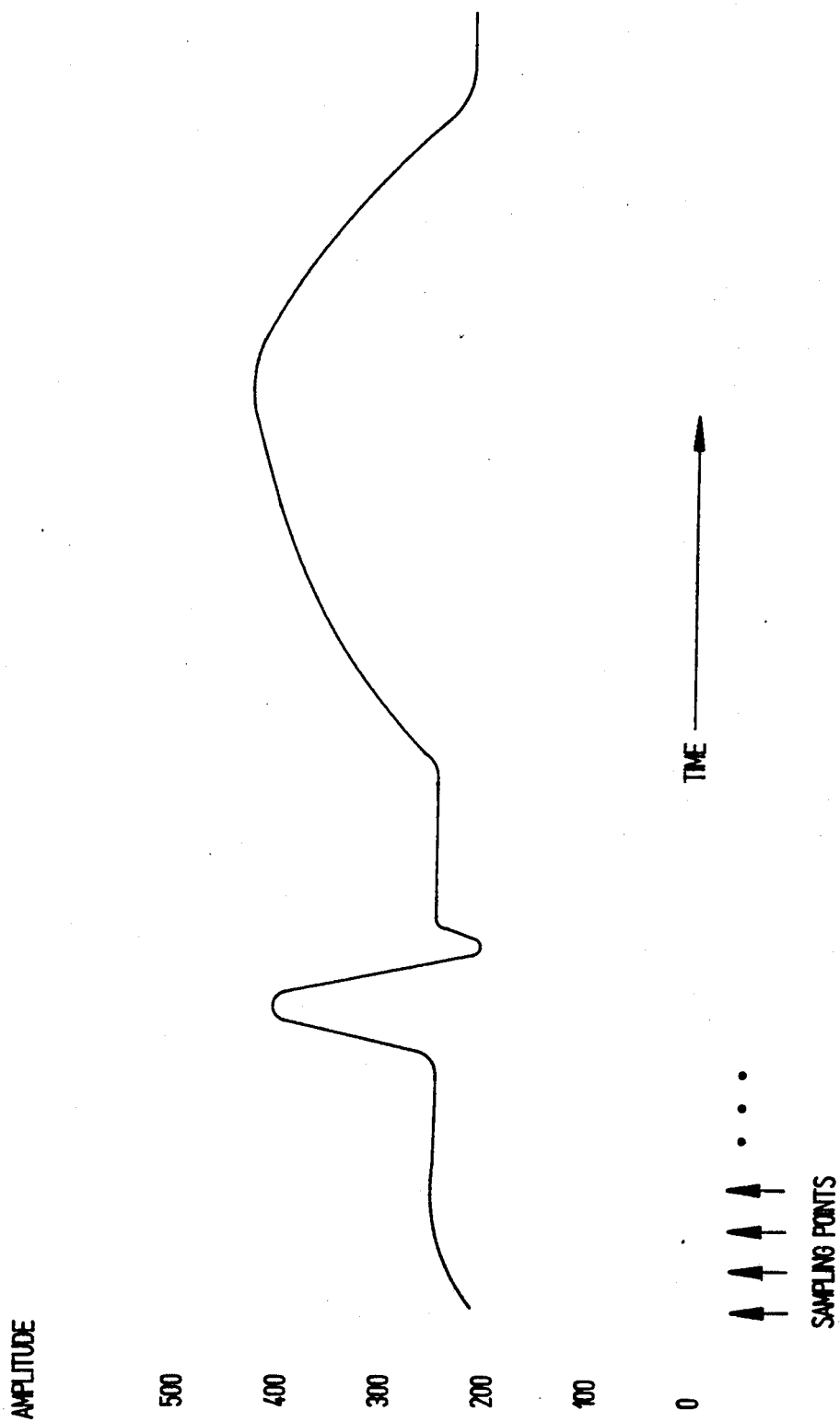
FIG. 4 illustrates a hypothetical input-sample stream which is processed in accordance to the rational compression mode.

FIG. 4 illustrates a hypothetical input signal having an amplitude which fluctuates between 218 and 500. The input-sample stream, corresponding to the intersections of the sampling points and the input signal are as follows:
218, 242, 251, 250, 250, 252, 325, 420, 190, 250, 250, 253, 257, 300, 340, 375, 408, 432, 452, 467, 485, 500, 501, 482, 462, 444, 422, 392, 357, 320, 278, 253, 250, 249.
From this input stream, the pair/peak picking technique can be applied to provide the representative output samples corresponding to a compression factor of 17/4 (4.25) and a time-offset ($J_I$) of 0.75, where the intermediate sample, if required, is calculated as:

(saved-sample)+($J_F$ X (new-sample−saved-sample))

such that the first output sample can be calculated as follows:

236=218+0.75 (242−218) and update
$J=J_F+4.25=5.0$ the second representative output sample is calculated as follows:
252=greatest among 236 (pivot-sample), 242, 251, 250, 250 and 252 it is also necessary to update $J=J_F+4.25=4.25$. The third and fourth representative output samples are calculated as follows:

a straddle condition exits, therefore, must choose the maximum and minimum of two groups of input samples:

420, 190=maximum and minimum in order of occurrence from 252 (pivot-sample), 325, 420, 190, 250, 253, 257, 300, 320 (where the last "saved-sample" is calculated as 320=300+0.5(340−300) and finally, the last value is calculated as:

447=greatest among 320 (pivot-sample) 340, 375, 408, 432 and 447 (where 447 is calculated as 432+0.75(452−432).

Although the best results are obtained by the forgoing integer and rational number compression methods, changes and modification of the invention, as set forth in the specifically described embodiments, can be carried out without departing from the scope of the invention which is intended to be limited only by the scope of the appended claims.

I claim:

1. A patient monitoring system comprising:
   (A) a sensor for measuring a physiological parameter of a patient and generating a physiological signal therefrom;
   (B) a digitizer for converting the physiological signal to a series of digital data samples;
   (C) storage for an output sample;
   (D) a comparator for receiving a group of input samples, for reading the stored output sample, and for determining, which of the following cases is true:
      (1) all samples of the group are greater than or equal to the stored output sample,
      (2) all samples of the group are less than or equal to the stored output sample, or
      (3) neither (1) nor (2) are true;
   (E) output means responsive to the comparator for updating the stored output sample in a way that depends upon the comparator determination as follows: if the first case is true, storing as the next output sample a value that is greater than the current output sample, and if the second case is true, storing as the next output sample a value that is less than the current output sample; and
   (F) an imaging medium for receiving the output samples and displaying a visible representation of the physiological parameter.

2. The patient monitoring system of claim 1 in which the output means stores a maximum value of that group of input samples when the first case is true, stores a minimum value of that group of input samples when the second case is true, and otherwise stores a sequence of two output samples that is, in the order in which they occur, both a maximum and a minimum of a combination of that group of input samples and a next group of input samples.

3. The patient monitoring system of claim 2 further comprising:
   means for storing an input sample index J, having an integer part $J_I$ and a fraction part $J_F$;
   means for incrementing J by an amount N, which is the number of input samples for each output sample; and
   means for creating an additional input sample to be included in a group of input samples by interpolating by the fraction $J_F$ between the input sample identified by $J_I$ and the next successive input sample.

4. The patient monitoring system of claim 1 further comprising:
   means for storing an input sample index J, having an integer part $J_I$ and a fraction part $J_F$;
   means for incrementing J by an amount N, which is the number of input samples for each output sample; and
   means for creating an additional input sample to be included in a group of input samples by interpolating by the fraction $J_F$ between the input sample identified by $J_I$ and the next successive input sample.

5. A process for creating a visible representation of a physiological parameter, the process comprising the steps of:
   (A) In a patient monitoring system measuring a physiological parameter and generating a signal indicative thereof;

(B) digitizing the signal, thereby creating a series of digital input samples;

(C) storing an initial output sample;

(D) for a group of input samples, determining which of the following cases is true for this group of input samples and the current output sample:
   (1) all samples of the group are greater than or equal to the output sample,
   (2) all samples of the group are less than or equal to the output sample, or
   (3) neither (1) nor (2) are true;

(E) if the first case is true, storing as the next output sample a value that is greater than the current output sample;

(F) if the second case is true, storing as the next output sample a value that is less than the current output sample;

(G) continuing this process for each next group of input samples, until all of the input samples have been read; and (H) converting the output samples to visible form on an imaging medium to provide a representation of the parameter of the system that is compressed and yet tends to visually retain significant features.

6. The process according to claim 5 in which the output samples are displayed on a discrete imaging medium.

7. The process according to claim 6 in which said discrete imaging medium is a CRT display.

8. The process according to claim 6 in which said discrete imaging medium is a strip chart recorder.

9. The process of claim 5 in which:
the next output sample stored in step (E) is a maximum value of that group of input samples;
the next output sample stored in step (F) is a minimum value of that group of input samples; and
if the third case is true, storing a sequence of two output samples that is, in the order in which they occur, both a maximum and a minimum of a combination of that group of input samples and a next group of input samples.

10. The process of claim 9 further comprising the step of determining the samples to be included in a group of input samples by incrementing an input sample index J, which has an integer part $J_I$ and a fraction part $J_F$, by an amount N, which is the number of input samples for each output sample, and, when $J_F$ is non-zero, calculating the value of an additional sample to be included in the group of input samples by interpolating by the fraction $J_F$ between the input sample identified by $J_I$ and the next successive input sample.

11. The process of claim 5 further comprising the step of determining the samples to be included in a group of input samples by incrementing an input sample index J, which has an integer part $J_I$ and a fraction part $J_F$, by an amount N, which is the number of input samples for each output sample, and, when $J_F$ is non-zero, calculating the value of an additional sample to be included in the group of input samples by interpolating by the fraction $J_F$ between the input sample identified by $J_I$ and the next successive input sample.

12. The process of claim 5 in which the measuring step is accomplished by use of a patient monitoring system that measures a physiological parameter of a patient.

13. The process of claim 9 in which the measuring step is accomplished by use of a patient monitoring system that measures a physiological parameter of a patient.

14. The process of claim 10 in which the measuring step is accomplished by use of a patient monitoring system that measures a physiological parameter of a patient.

15. A process for creating a visible representation of a physiological parameter, the process comprising the steps of:

measuring a physiological parameter of a patient and generating a physiological signal indicative thereof;

digitizing the physiological signal, thereby creating a series of digital input samples;

reading into memory a group of N consecutive input samples;

identifying and storing a first output sample and a first pivot sample, representative of the first of said group of input samples wherein, said pivot sample is located between said output sample and the first input sample of the next group of input samples;

demarcating the sample interval by an index variable J having a separate integer part $J_I$ and fractional part $J_F$;

calculating the value of the pivot sample by interpolating between the value of the output sample, the value of the first input sample of the next group and the fractional part of the sample interval $J_F$;

determining which input sample, including the pivot sample, has the maximum value;

determining which input sample, including the pivot sample, has the minimum value;

comparing said maximum and minimum values with said stored output sample;

identifying and storing said maximum value as the output sample if both said maximum and minimum values are greater than said stored output sample;

identifying and storing said minimum value as said next output sample if said maximum and minimum value are both less than said stored output sample;

reading into memory the next group of N input samples if the minimum value is less than the stored output sample and the maximum value is greater than the stored output sample, identifying and storing, in the order of occurrence, the input samples from the first group and the next group of N samples which have the maximum and minimum values; and converting the output samples to visible form on an imaging medium to provide a representation of the physiological parameter that is compressed and yet tends to visually retain physiologically significant features.

* * * * *